US012485445B2

(12) United States Patent
Tarantini

(10) Patent No.: US 12,485,445 B2
(45) Date of Patent: Dec. 2, 2025

(54) PIPE SHAPING GUIDE, COATING PRODUCT SPRAYER COMPRISING SUCH A GUIDE AND COATING PRODUCT APPLICATION INSTALLATION COMPRISING SUCH A SPRAYER

(71) Applicant: EXEL INDUSTRIES, Epernay (FR)

(72) Inventor: Joseph Tarantini, Epernay (FR)

(73) Assignee: EXEL INDUSTRIES, Epernay (FR)

( * ) Notice: Subject to any disclaimer, the term of this patent is extended or adjusted under 35 U.S.C. 154(b) by 357 days.

(21) Appl. No.: 18/313,553

(22) Filed: May 8, 2023

(65) Prior Publication Data

US 2023/0364632 A1 Nov. 16, 2023

(30) Foreign Application Priority Data

May 16, 2022 (FR) ...................................... 2204622

(51) Int. Cl.

*B05B 15/65* (2018.01)
*B05B 13/02* (2006.01)
*B05B 13/04* (2006.01)

(52) U.S. Cl.

CPC .......... *B05B 15/65* (2018.02); *B05B 13/0278* (2013.01); *B05B 13/0431* (2013.01)

(58) Field of Classification Search

CPC .. B05B 15/65; B05B 13/0278; B05B 13/0431
USPC ....... 239/223, 224, 296, 525, 600, 690, 699, 239/700, 703, 704
See application file for complete search history.

(56) References Cited

U.S. PATENT DOCUMENTS 4,520,949 A * 6/1985 Seitz ......................... B05B 5/04 220/4.21
2004/0124292 A1 7/2004 Giuliano
2006/0272311 A1 12/2006 Melcher
2009/0078801 A1* 3/2009 Takahashi ............. B05B 5/0407 239/700

(Continued)

FOREIGN PATENT DOCUMENTS

EP 0850693 A1 7/1998
FR 3109323 A1 10/2021

(Continued)

OTHER PUBLICATIONS

GB Translation for Publication JP4106660.
FR 2204622, INPI Rapport de Recherche Preliminaire, Dec. 9, 2022, 2 pages.

*Primary Examiner* — Steven J Ganey
(74) *Attorney, Agent, or Firm* — Soquel Group LLC

(57) ABSTRACT

A shaping guide of at least one pipe for feeding a fluid product into a spraying element belonging to a sprayer of coating product is configured for being mounted around a central body of the sprayer and includes at least one spiral-shaped retaining portion for retaining in position a section of the feeding pipe, with a predetermined geometry, configured for providing electrical insulation between a mouth and an outlet of the feeding pipe. Each retaining portion has, in cross-section, a concave inner shape configured for surrounding the pipe section over more than half of the circumference thereof, preferentially, a shape in the form of an arc of a circle or U-shaped, which extends over an angular sector with an angle at the apex greater than or equal to 185°.

21 Claims, 6 Drawing Sheets

(56) References Cited

U.S. PATENT DOCUMENTS

| | | | | |
|---|---|---|---|---|
| 2011/0114802 | A1 | 5/2011 | Hjerpe | |
| 2021/0323019 | A1* | 10/2021 | Vanzetto | B05B 13/0431 |

FOREIGN PATENT DOCUMENTS

| | | | |
|---|---|---|---|
| JP | 4106660 | U | 9/1992 |
| WO | 2021009046 | A1 | 1/2021 |

* cited by examiner

PIPE SHAPING GUIDE, COATING PRODUCT SPRAYER COMPRISING SUCH A GUIDE AND COATING PRODUCT APPLICATION INSTALLATION COMPRISING SUCH A SPRAYER

REFERENCE TO RELATED APPLICATION

This application is a U.S. non-provisional application claiming the benefit of French Application No. 22 04622, filed on May 16, 2022, the contents of which are incorporated herein by reference in their entirety.

TECHNICAL FIELD OF THE INVENTION

The present invention relates to a guide for shaping at least one pipe for feeding a fluid product into a spraying element belonging to a sprayer of coating products. The present invention further relates to a coating product sprayer including, inter alia, at least one pipe for feeding a coating product to be sprayed and/or a cleaning product, as well as a shaping guide such as mentioned above. The invention further relates to an installation for applying a coating product including such a sprayer.

BACKGROUND OF THE INVENTION

In the field of the application of a coating product to objects to be coated, it is known how to supply to a spraying element of a sprayer, a fluid product, such as a liquid, a two-phase mixture or a mixture of air and of powder. Given the bulk of a sprayer, the pipe, which is most often a hose, has to be placed in a limited space, inside the sprayer, following an imposed path, most often having the shape of a spiral, with a predetermined length.

The installation of such a hose within the sprayer is a complex operation which requires a qualified workforce and the repeatability of which between two sprayers of the same range is not guaranteed. Such installation has to be further carried out during a maintenance operation, during which the hose has to be inspected and/or replaced.

On the other hand, the connection points of the pipe ends within the coupling are imposed by the location of the corresponding fittings.

Throughout the length of the pipe, the minimum radius of curvature of the pipe has to keep a value greater than a threshold value and the internal cross-section of the pipe has to keep a sufficient surface area, so as not to interfere with the circulation of the fluid or of a shuttle, sometimes called a scraper, whenever such a shuttle is used, e.g. as per the technical teaching from WO-A-2021/009046. Indeed, in such case, the pipe is used for increasing an insulation distance and the passage of the shuttle has to be guaranteed, without any blocking due to an incorrect positioning of the pipe. More particularly, the pipe is not to be pinched, which could locally reduce the surface area of the inner cross-section thereof.

U.S. Patent A-2006/0272311 discloses a guide for a pipe in an essentially rectilinear configuration, with pipe passage holes aligned axially. The geometry of such guide makes the guide incompatible with mounting around a central sprayer body.

EP-A-0850693 teaches how to provide, on the outside of the body of a sprayer, guiding ribs for a pipe for feeding a coating product into a rotating bowl. Such ribs define square-section notches which cannot be used for retaining the pipe in place which tends to expand radially, to the point that a cover has to be fitted around the ribs. Such body is a part with a complex geometry, difficult to manufacture.

As for U.S. Patent A-2004/012292 and FR-A-3109323, they disclose devices wherein a pipe bears against a corrugated zone which cannot be used for effectively retaining the pipe in place, except when using clips which carry the risk of locally reducing the flow cross-section thereof.

Thus, the known equipment raises problems, both in terms of manufacture, in terms of maintenance and in terms of use.

SUMMARY OF THE INVENTION

It is such problems that the invention intends more particularly to overcome by proposing a new guide for shaping at least one feeder pipe belonging to a sprayer, the guide being used for a correct and repeatable positioning from one sprayer to another, including after a maintenance operation, and providing a smooth flow of the fluid, or even of a shuttle.

The invention relates to a guide for shaping at least one pipe for feeding a fluid product into a spraying element belonging to a coating product sprayer, the guide being configured for being mounted around a body of the sprayer and including at least one spiral-shaped retaining portion for retaining a section of the feeder pipe in position, with a predetermined geometry, configured for providing electrical insulation between a mouth and an outlet of the feeder pipe. Furthermore, each retaining portion has, in cross-section, a concave inner shape configured for surrounding the pipe cross-section over more than half of the circumference thereof, preferentially, a shape in the form of an arc of a circle or U-shaped, which extends over an angular sector with an angle at the apex greater than or equal to 185°.

By means of the invention, the shaping guide ensures that the feeder pipe, which is advantageously flexible, keeps an overall geometry which does not hinder the flow of the fluid, in particular because the risks of pinching or localized crushing of the hose are eliminated, as well as the risk of creating a zone with a radius of curvature inducing a hindrance to the circulation of the fluid or of a possible shuttle. Furthermore, the shape of the shaping guide, with the possibility thereof of being mounted around the central body of the sprayer, facilitates integration of the guide into the sprayer without increasing the length of the latter. The geometry of the retaining portion, with a shape which surrounds the pipe over more than half of the circumference thereof, ensures that the pipe is held in position in the retaining portion, without the need for a cover or means for clamping the pipe onto the support. Thus, the support remains easy to use and the pipe is not at risk of being deformed locally to the point of generating an untimely head loss or of blocking the passage of a shuttle. Such geometry of the retaining portion may be used for installing the pipe by sliding the pipe along the retaining portion, without any risk of the pipe jutting radially outwards. Thereby, the pipe may be mounted on the shaping guide in a reproducible and relatively easy manner.

According to advantageous but non-mandatory aspects of the invention, such a shaping guide may incorporate one or a plurality of the following features, taken individually or according to any technically permissible combination:

- The guide includes at least two portions for retaining in position two distinct pipe sections.
- The two retaining portions are centered on a common axis.

The shaping guide includes inlet and outlet elbows which let a pipe switch from an orientation overall parallel to the common axis to an orientation overall ortho-radial to the axis, or vice-versa.

The guide includes a positioning flange of at least one output element of a portion for retaining in position.

The guide includes an almost-annular part which extends along a longitudinal axis and which has a longitudinal slot, whereas, in the rest configuration of the shaping guide, the almost-annular part surrounds the longitudinal axis over strictly less than 360° and over at least 330°, preferentially over at least 345°, preferentially again over at least 351°.

The shaping guide is made by additive manufacturing.

Each retaining portion includes a plurality of turns.

Each retaining portion has a developed length greater than or equal to 80 cm, preferentially greater than or equal to 100 cm.

According to another aspect, the invention relates to a coating product sprayer including a spraying element and at least one pipe for feeding the spraying element with coating product to be sprayed and/or with cleaning product. According to the invention, the sprayer includes a pipe shaping guide such as mentioned hereinabove, while a section of the pipe is engaged into, and held in position with a geometry determined by, the portion for retaining the shaping guide in position.

Such sprayer is easier to manufacture and to maintain than the sprayers of the prior art, along with less risk of blocking the feeder pipe.

According to advantageous but non-mandatory aspects of the invention, such a sprayer may incorporate one or a plurality of the following features, taken individually or according to any technically permissible combination:

The sprayer includes a central body and the shaping guide is mounted around the central body.

The shaping guide is equipped with at least one positioning pattern in relief on the central body and/or on another part of the sprayer.

The sprayer is equipped with a shuttle circulating inside the pipe and the portion for retaining the section of the feeder pipe in position is configured so that a radius of curvature of the pipe in place on the guide is, throughout the length of the pipe, greater than or equal to a minimum bend radius so that the shuttle may circulate inside the pipe.

A ratio between a length of the feeder pipe between connection couplings of the hose in the sprayer and a distance between the couplings, measured parallel to a longitudinal axis of a part of a main body of the sprayer, is strictly greater than 1, preferentially greater than or equal to 5, preferentially yet again greater than or equal to 10.

According to a third aspect, the invention relates to an installation for applying a coating product including a sprayer as mentioned hereinabove.

Such installation overall has the same advantages as the aforementioned sprayer.

BRIEF DESCRIPTION OF THE DRAWINGS

The invention will be better understood and other advantages of the invention will appear more clearly in light of the following description of two embodiments of a shaping guide, of a sprayer and of an installation for applying coating products according to the principle thereof, given only as an example and made with reference to the enclosed drawings, wherein.

DETAILED DESCRIPTION

Figure 1:
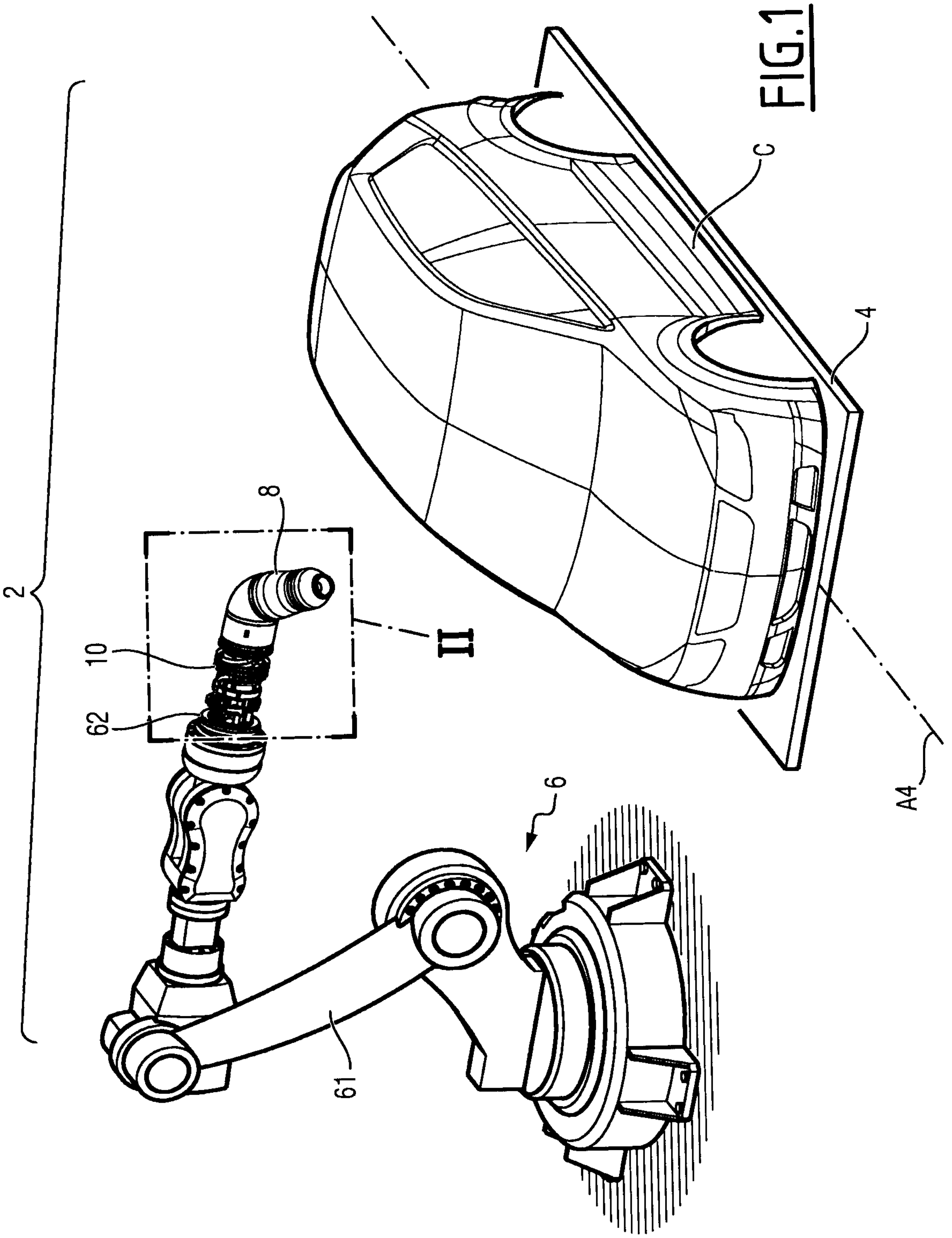
FIG. 1 is a schematic perspective representation of the principle of an installation for applying coating product according to the invention, incorporating a sprayer and a shaping guide also according to the invention.

An installation 2 shown in FIG. 1 is used for applying a coating product, such as a paint or a varnish, to a motor vehicle body C moved by a conveyor 4 along a conveying axis A4. Installation 2 includes a plurality of robots, only one of which is shown in FIG. 1 with reference 6. An arm 61 of each robot 6 carries a sprayer 8 for coating product according to the invention. More precisely, each sprayer 8 is mounted on a wrist 62 which forms the end of arm 61 of a robot 6.

In practice, and according to an aspect of the invention which is not shown, robots 6 are distributed along conveying axis A4, on both sides of conveyor 4.

As may be seen in FIG. 1, each robot 6 is a multi-axis robot. In a variant, the robot may be of another type, in particular, a reciprocator.

In FIG. 1, objects are not represented in correct scale. The scale of robot 6 and of sprayer 8 is enlarged compared to the scale of body C.

Sprayer 8 may rotate and includes a main body 82, including two parts 84 and 86, which define a first longitudinal axis A84 and a second longitudinal axis A86, respectively, the axes being non-parallel.

In a variant, longitudinal axes A84 and A86 are parallel or even merged.

Sprayer 8 further includes a bowl 88 mounted apt to rotate about axis A84 and driven in rotation by means of a turbine (not shown), which is advantageously an air turbine, and which is supported by part 84 of body 82. Bowl 88 forms a spraying element of sprayer 8 which is rotary herein.

In the present example, sprayer 8 is electrostatic and is associated with a high-voltage unit (not shown) which supplies the sprayer with a DC voltage on the order of −60 kV which electrostatically charges the coating product sprayed by bowl 88 which is rotated about axis A84.

The type of sprayer 8 is not limiting. In a variant, sprayer 8 does not have a bowl, i.e., it is not rotary, and includes one or a plurality of nozzles which form as many spraying elements. According to another variant, sprayer 8 is not electrostatic. According to yet another variant, sprayer 8 is a manual gun.

Sprayer 8 includes a device 90 for feeding bowl 88 with coating product and cleaning product, which is interposed between part 86 of body 82 and wrist 62 of robot 6.

Sprayer 8 also includes a cover (not shown) which protects feeder device 90, in particular against splashes of coating product. The cover is omitted in FIGS. 1 and 2, to facilitate seeing the constituent elements of feeder device 90. The cover is tubular, with a section similar to the external shapes of wrist 62 and of body 86.

Figure 2:
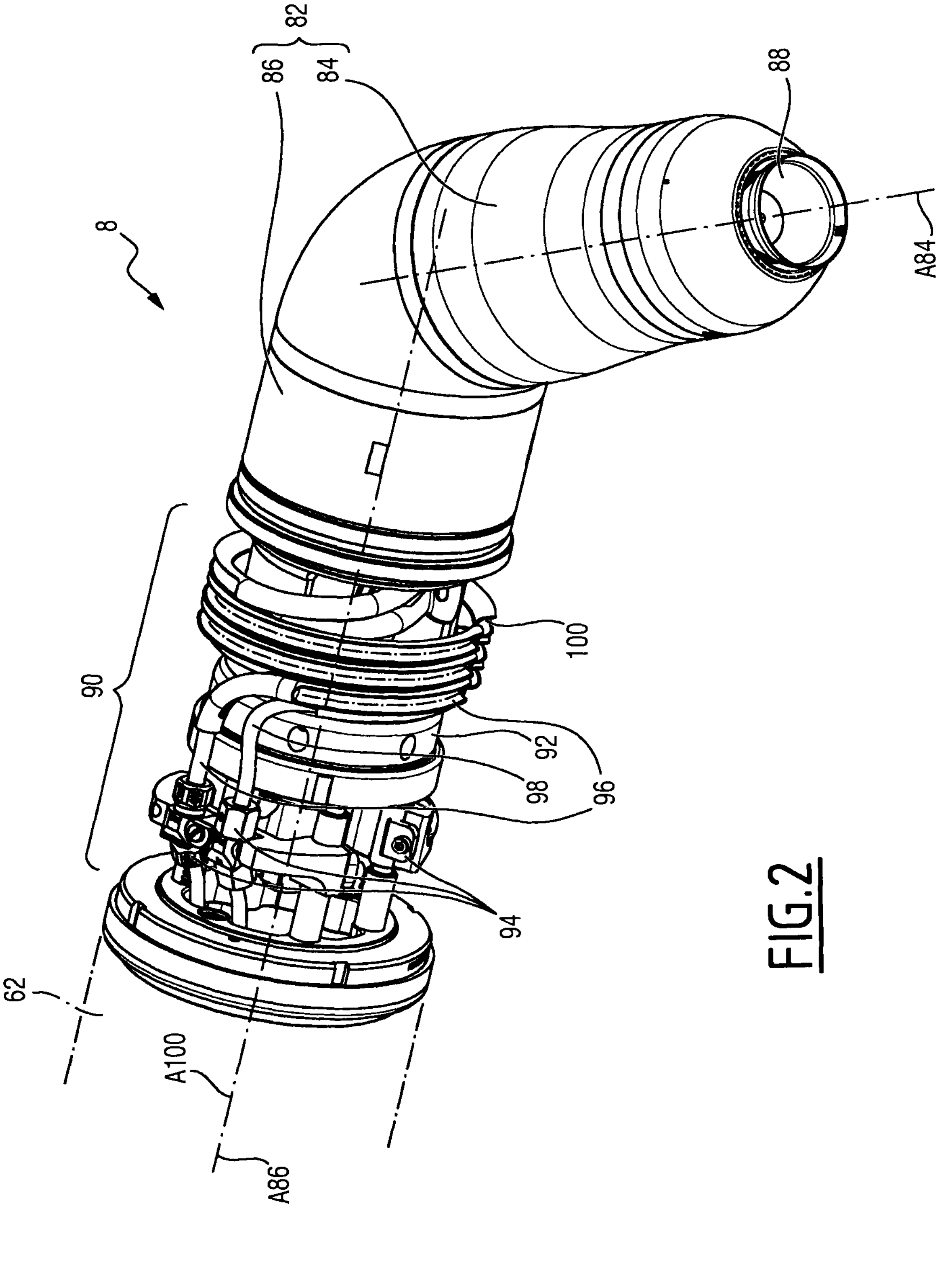
FIG. 2 is a view on a greater scale of the detail II shown in FIG. 1.

Feeder device 90 includes a central body 92, secondary with respect to body 82, and a plurality of couplings, some of which are visible in FIG. 2 with the reference 94 and which connect hoses, two of which are visible in the same FIG. 2 with the references 96 and 98. In FIG. 2, a part of pipe 96 is represented by a centerline. The mouth of each of hoses 96 and 98 is connected to a coupling 94. The outlet hole of each of hoses 96 and 98 is connected to a coupling mounted on part 86 of main body 82.

The term "hose" means that pipes 96 and 98 may deform elastically under the effect of a bending action performed manually by a user. In practice, such pipes can be made of a synthetic material such as polytetrafluoroethylene or PTFE, which has satisfactory rinsing properties and coefficient of friction with respect to the fluid products which feed bowl 88. As an example, but not limited to, pipes 96 and 98 may have an internal diameter of 4 millimeters (mm) and a wall thickness of 1 mm.

Within the volume defined by the cover around feeder device 90, each pipe 96 and 98 extends between two couplings, 94 and an equivalent coupling, with a length Lg strictly greater than the distance between the couplings, the distance being measured parallel to axis A86, the length Lg being sufficient for generating an electrical insulation zone between the two couplings, when the internal volume of the pipe was purged.

In practice, each retaining portion 106 or 116 has a developed length, i.e., a length measured according to the sequence of turns formed by the retaining portion, which is greater than or equal to 80 cm, preferentially greater than or equal to 100 cm.

In an example of a sprayer, the distance d94 between coupling 94 and the equivalent coupling, measured parallel to axis A86, should not exceed 102 mm. At the inlet and outlet of hoses 96 and 98, the hoses should have a straight portion of at least 25 mm for the connection thereof. On the other hand, the total length Lg of hoses 96 and 98 is about a hundred cm, taking into account the resistivity of the product to be sprayed. In the example shown in the figures and taking into account the resistivity of the product to be sprayed, the length Lg is approximately 120 cm. In practice, each pipe 96 or 98 forms a spiral with a plurality of windings around central body 92. Such windings or turns should not be contiguous, so as to prevent electrical creeping therebetween.

In order to ensure correct positioning of each pipe 96 and 98 within sprayer 8, a shaping guide 100 is mounted around central body 92 and designed for defining a path for each of the pipes between coupling 94 and the equivalent coupling to which these pipes are connected.

Each hose 96 or 98, throughout the path thereof, should not make any bend with a radius of curvature of less than 30 mm, and each change of direction must be tangential to the adjacent parts of the pipe. Each turn only moves away from the starting point. The turns formed by each pipe are spaced apart from each other, with a center distance of 8 mm, and never let the hose be in contact with another hose nor even with itself. The guide ensures the repeatability of all the constraints and preserves the integrity of the hose.

The shape imparted by shaping guide 100 to hoses 96 and 98, enables each of the hoses to provide electrical insulation between the mouth thereof and the outlet hole thereof, including when a hose is filled with fluid coating product to be sprayed.

shaping guide 100 is a one-piece part made of electrically insulating synthetic material, e.g. polyamide, in particular such as PA 12.

Preferentially, shaping guide 100 is produced by additive manufacturing, in 3D printing. Such an additive manufacturing process may, e.g., be a multi-jet fusion manufacturing process or MJF. Such a method is used for optimizing overall size of shaping guide 100 and is compatible with the left shape thereof. Indeed, the shape of shaping guide 100 makes this guide very difficult, if not impossible, to mold or to machine.

The method of manufacture and the constituent material of shaping guide 100 impart greater rigidity to the shaping guide than the rigidity of pipes 96 and 98.

Given the method of manufacture thereof, longitudinal openings have to be provided in shaping guide 100 in order to discharge the excess powder during manufacture.

A100 denotes a longitudinal and central axis of shaping guide 100.

Shaping guide 100 includes an inlet elbow 102 for pipe 96, which may be used for switching pipe 96 from an orientation overall parallel to axis A100 to an orientation overall ortho-radial to axis A100. Opposite mouth 104, elbow 102 comes out into a first retaining portion 106 which has the shape of a spiral centered on longitudinal central axis A100 and which, in cross-section in a plane radial to axis A100, has a rounded U-shape, with a base 107 thereof facing axis A100. The internal surface of first retaining portion 106 has an overall circular cross-section, with a diameter equal to or slightly greater, within less than 5%, than the nominal external diameter of pipe 96.

In a variant, the diameter of the internal section of first retaining portion 106 is greater by about 25% than the nominal external diameter of pipe 96.

In FIG. 2, the section of hose represented by a centerline is the section which is in place in retaining portion 106. Hose 96 is partially represented by a centerline in FIGS. 3-5, outside shaping guide 100.

Opposite bend 102, first retaining portion 106 is connected to an outlet bend 108, the opening 110 of which is oriented towards part 86 of body 82. Elbow 108 may be used for switching pipe 96 from an ortho-radial orientation to an orientation parallel to axis A100.

Shaping guide 100 includes an inlet tube 112 for pipe 98, the mouth of which is denoted by 114 and which comes out, opposite the mouth, into a second retaining portion 116 which also has the shape of a spiral centered on axis A100 and which has, in a cross-section in a plane radial to axis A100, a U-shape with a base 117 thereof opposite to axis A100.

Figure 3:
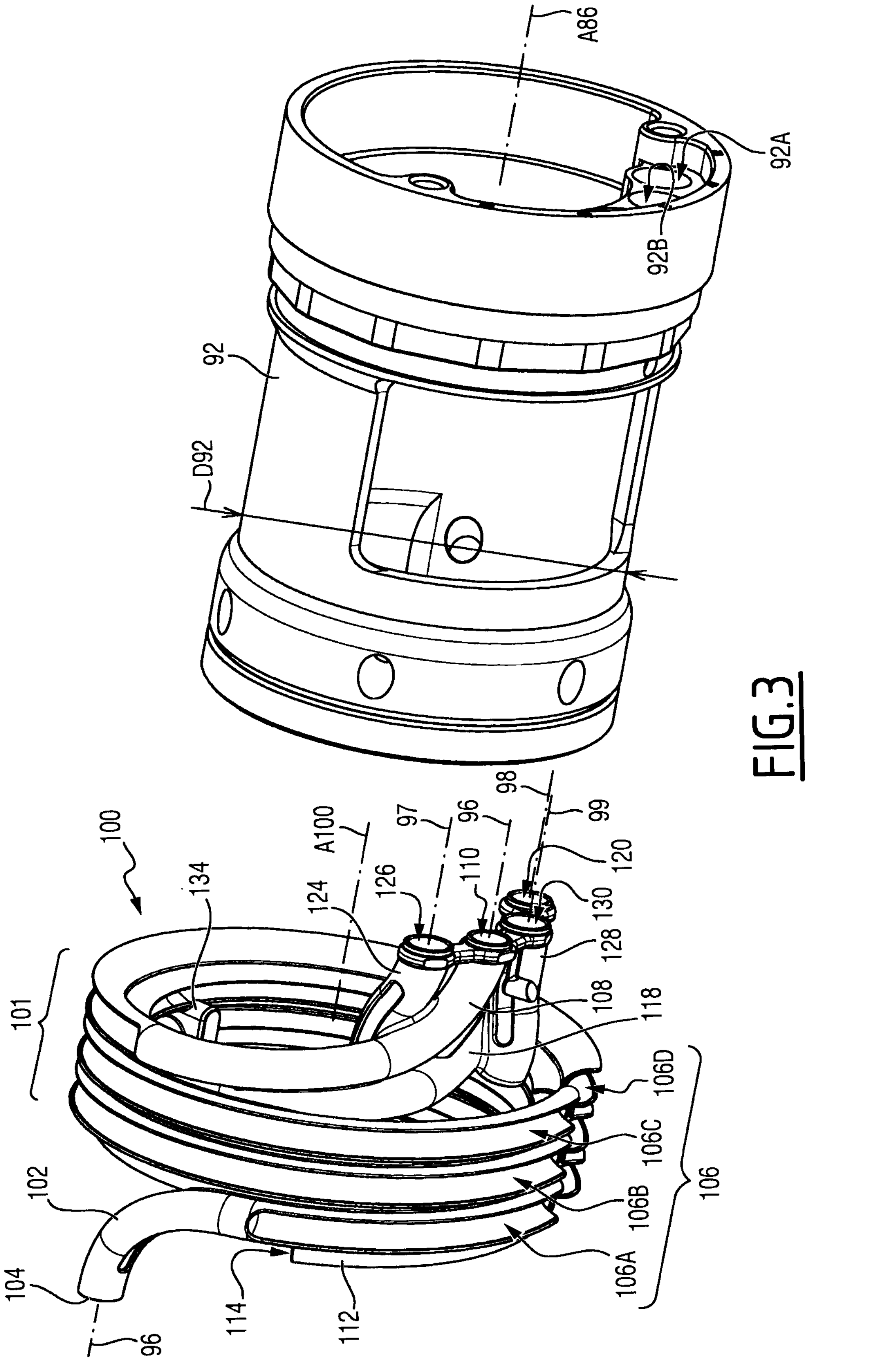
FIG. 3 is an exploded perspective view of two constituent parts of the sprayer shown in FIG. 1, including a shaping guide according to the invention.
Figure 4:
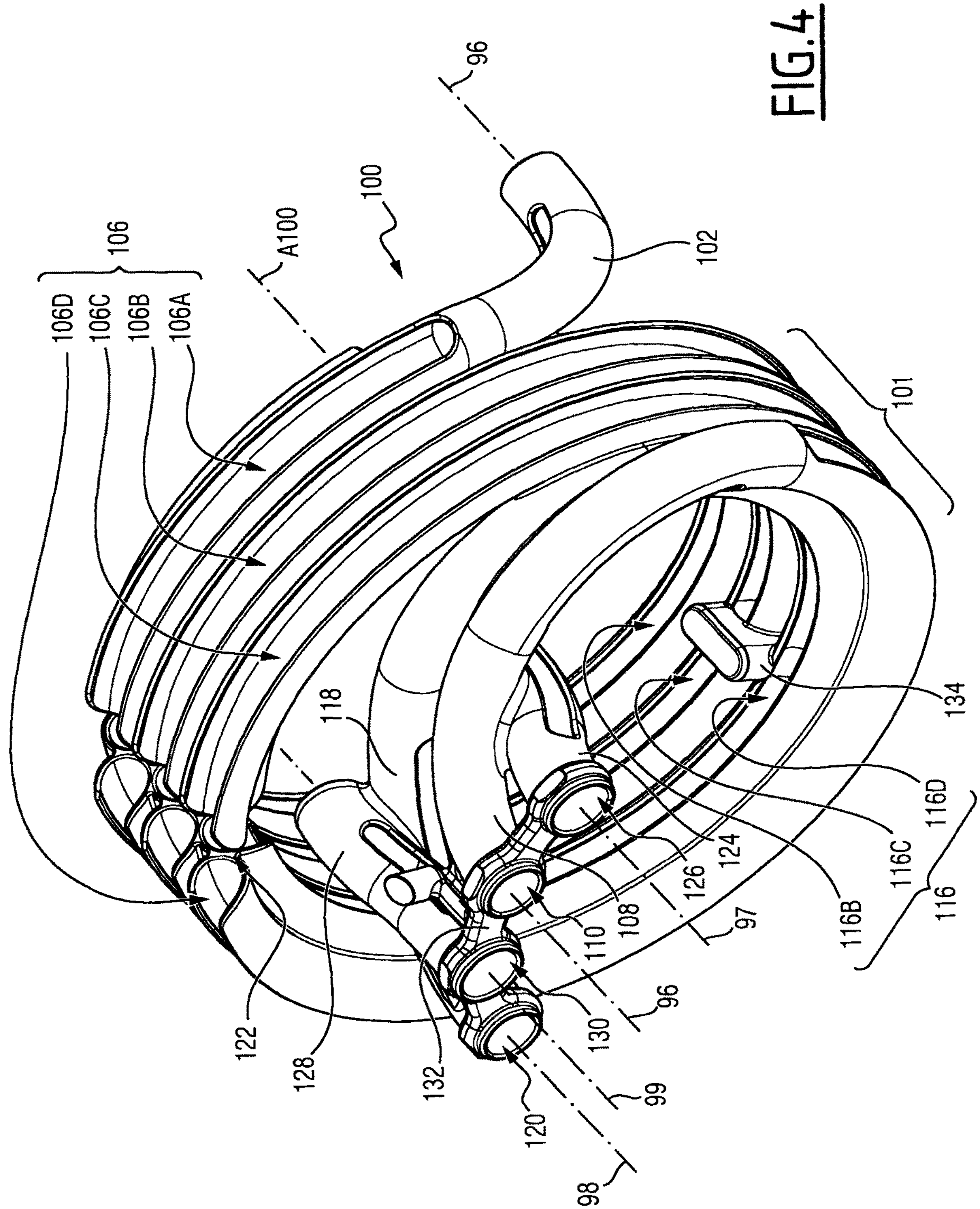
FIG. 4 is a perspective view, from another angle, of the shaping guide.
Figure 5:
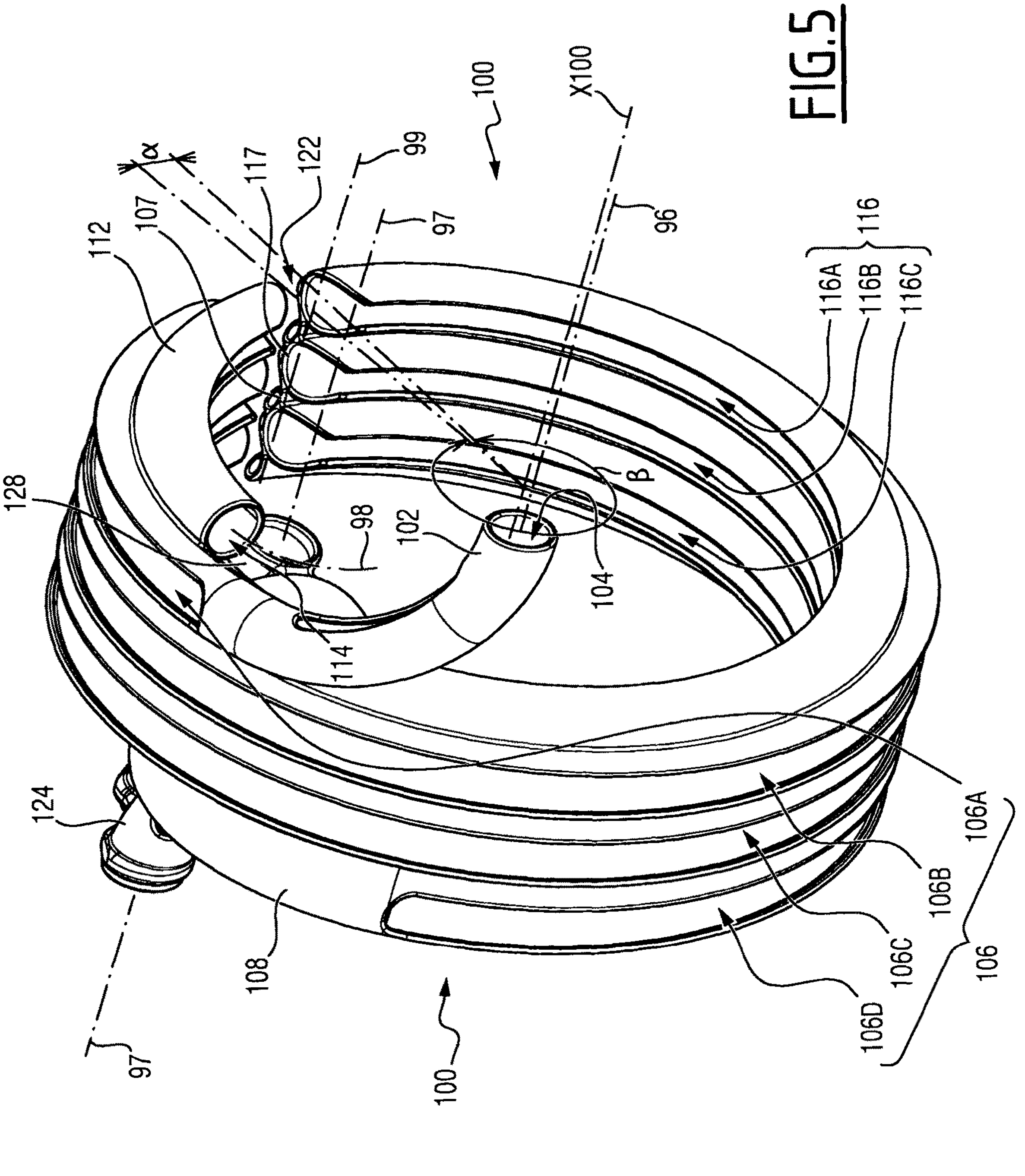
FIG. 5 is a perspective view, from another angle, of the shaping guide.

Hose 98 is partially represented by a centerline in FIGS. 3-5, outside shaping guide 100.

In the present example of embodiment, the U-shaped sections of the two retaining portions 106 and 116 have the longitudinal openings thereof oriented opposite each other, namely, for first retaining portion 106, radially outwards with respect to the axis A100, i.e., along a radial centrifugal direction with respect to base 107 thereof, and, for second retaining portion 116, radially inwards with respect to axis A100, i.e., along a radial centripetal direction with respect to base 117 thereof.

The longitudinal openings are necessary for discharging excess powder during production of shaping guide 100 by additive manufacturing. The consequence of the longitudinal openings is that retaining portions 106 and 116 do not surround pipes 96 and 98 throughout the circumference thereof.

Advantageously, second retaining portion 116 is arranged radially to axis A100 inside first retaining portion 106.

Advantageously, base 107 of first retaining portion 106 is adjacent to base 117 of second retaining portion 116.

Second retaining portion 116 is extended, on the side of body 86, by an outlet bend 118, the outlet 120 of which is oriented parallel to outlet 110. Elbow 118 may be used for switching pipe 98 from an ortho-radial orientation to an orientation parallel to axis A100.

The two retaining portions 106 and 116 together form, between inlet elements 102 and 112 and outlet elements 108 and 118, an almost-annular part 101 of shaping guide 100, which extends along axis A100 and which surrounds the axis.

Part 101 of shaping guide 100 is not completely annular insofar as this guide is interrupted by a longitudinal slot 122 which extends throughout the length of part 101 and which is parallel to axis A100.

As a result, first retaining portion 106 is divided into four retaining portion segments 106A, 106B, 106C, 106D which together form a plurality of turns about axis A100. Segment 106A extends between elbow 102 and slot 122. Segment 106B extends segment 106A beyond slot 122 and returns to the slot. Segment 106C extends segment 106B beyond slot 122 and returns towards the slot. Segment 106D extends segment 106C beyond slot 122 and ends in elbow 108.

In the same way, slot 122 divides second retaining portion 116 into four segments 116A, 116B, 116C and 116D which follow one another between tube 112 and bend 118, on both sides of slot 122, and which together form a plurality of turns about axis A100.

In cross-section, i.e., in cross-section in a plane radial to axis A100, each retaining portion 106 and 116 has a concave inner shape which surrounds pipe 96 or 98 over more than half of the circumference thereof. The above may be achieved by an arc of a circle or a U-shape which extends over an angular sector with an angle at the apex greater than or equal to 185°.

On the other hand, given the longitudinal openings of retaining portions 106 and 116 which extend throughout the length, the concave inner shape of each retaining portion 106 and 116 surrounds pipe 96 or 98 over only part of the circumference thereof. In other words, pipes 96 and 98 are not completely covered by retaining portions 106 and 116.

Segments 106A, 106B, 106C and 106D of first retaining portion 106 are separated from one another, along a direction parallel to axis A100, by the lateral branches of the U-shaped section of the retaining portion. Thus, the windings or turns formed by the section of pipe 96 in place in first retaining portion 106 are non-contiguous, which prevents risk of electrical creepage. In the same way, the lateral branches of the U-shaped section of segments 116A, 116B, 116C and 116D of second retaining portion 116 are used for retaining the windings or turns formed by the section of pipe 98 in place in this portion.

Slot 122 imparts flexibility to shaping guide 100, which facilitates positioning thereof around central body 92. Indeed, it is possible to move the edges of slot 122 apart from each other by a distance greater than the minimum diameter D92 of central body 92, in order to engage shaping guide 100 around central body 92, along a direction radial to axis A86, which switches parts 92 and 100 from the configuration shown in FIG. 3 to the configuration shown in FIG. 2, where axes A86 and A100 are superposed.

In a variant of the invention (not shown), axes A86 and A100 are parallel without being merged when shaping guide 100 is mounted around body 92.

Shaping guide 100 further includes a first tubular element 124, the opening 126 of which is oriented like opening 110 of elbow 108. First tubular element 124 is used for guiding a pipe 97, represented by a centerline in FIGS. 3-5, outside shaping guide 100, which is of the same type as pipes 96 and 98 and which extends between couplings 94 and body 86, along a direction overall parallel to axis A86. First tubular element 124 is oriented so as to be accessible through part 101 of shaping guide 100, i.e., radially inside retaining portions 106 and 116. First tubular element 124 may thus be used for guiding and locally retaining hose 97 which runs, radially to axis A86 and to axis A100, between central body 92 and retaining portion 116, along almost-annular part 101 of shaping guide 100.

Shaping guide 100 includes a second tubular element 128, the opening 130 of which is oriented like opening 110 of elbow 108.

Second tubular element 128 has an analogous function to the function of first tubular element 124, and may be used for guiding and locally retaining another pipe 99, represented by a centerline in FIGS. 3-5, outside shaping guide 100, which is of the same type as pipes 96 and 98 and which extends between couplings 94 and body 86, along a direction overall parallel to axis A86. Pipe 99 runs, radially to axis A86 and to axis A100, between central body 92 and second retaining portion 116, along almost-annular part 101 of shaping guide 100.

Hoses 97 and 99 are advantageously made of the same material and with the same cross-section as pipes 96 and 98. However, the above is not mandatory because pipes 97 and 99 may be designed for letting flow fluids different from the fluids flowing through pipes 96 and 98, because these pipes do not have the same length and because these pipes do not have to form windings.

Once shaping guide 100 is in place on central body 92, openings 110, 120, 126 and 130 are aligned with through-orifices provided on the central body 92, two of which are visible in FIG. 3, with references 92A and 92B.

A flange 132 connects elbows 108 and 118 and tubular elements 124 and 128. Flange 132 is used for stiffening shaping guide 100 locally and for providing a relative positioning of hoses 96, 97, 98 and 99 emerging from such different parts. In practice, hoses 96, 97, 98 and 99 leaving elbows 108 and 118, and tubular elements 124 and 128 are parallel to axis A100, which facilitates connection thereof to couplings mounted on body 86 and not visible in the figures.

Shaping guide 100 also includes a stud 134 for anchoring onto central body 92. To this end, central body 92 is provided with a housing (not shown) for receiving stud 134, which makes possible a relative immobilization of parts 92 and 100 of sprayer 8, after shaping guide 100 has been fitted around central body 92.

Advantageously, stud 134 is provided radially inside almost-annular part 101, opposite, with respect to axis A100, the zone where hoses 97 and 99 run, so as not to interfere with the hoses.

During manufacture of sprayer 8 or during a maintenance operation, if it is necessary to fit or change one of pipes 96 or 98 for the first time, an operator inserts a new hose into one of mouths 104 or 114 and pushes this new hose through one of retaining zones 106 or 116 until the hose emerges from shaping guide 100 through one of openings 110 or 120. The effect of such operation is to automatically shape a section of the pipe in question which is located in retaining portion 106 or 116, with a radius of curvature imposed by the retaining portion and compatible with a well-controlled flow of the fluid through the pipe. The fluid may be a liquid coating product or a product in the form of a mixture of air and powder or a liquid or two-phase cleaning product. During such operation of manufacture of sprayer 8, pipes 96 and 98 do not run the risk of coming out of retaining portions 106 and 116 through the longitudinal openings thereof because of the internal shape of the retaining portions. Indeed, since such inner shape surrounds pipes 96 and 98 over more than half of the circumference thereof, pipe 96 is not at risk of being ejected from retaining portion 106, radially outwards with respect to axis A100, whereas pipe 98 is not at risk of being ejected from retaining portion 116, radially inwards with respect to axis A100. There is thus no risk that an operator damages pipes 96 and 98 during assembly, and reproducibility of the assembly is improved by shaping guide 100 which alone and permanently imposes the geometry of pipes 96 and 98 on sprayer 8.

Similarly, during manufacture of sprayer 8, or during a maintenance operation if it is necessary to fit or change one of pipes 97 or 99 for the first time, the operator inserts the new hose into one of tubular elements 124 or 128, placing this new hose, radially to axis A100, inside almost-annular part 101, with an orientation overall parallel to axis A100.

Once the different pipes have been mounted on shaping guide 100, the latter may be installed on central body 92, by moving the edges of slot 122 apart, as explained hereinabove, and then by engaging stud 134 in the corresponding housing provided on central body 92.

In practice, shaping guide 100 is preferentially installed around the secondary body before pipes 96-99 are mounted on shaping guide 100.

Whatever the order chosen, at the end of the assembly, axes A86 and A100 are then parallel or coincident and shaping guide 100 is oriented about axis A86 by means of cooperation of stud 134 and the corresponding housing of central body 92, in such a way that mouths 104 and 114 are correctly positioned with respect to couplings 94, while openings 110, 120, 126 and 130 are correctly positioned with respect to holes 92A, 92B and equivalent holes.

In particular, each hose 96 and 98 has a well-defined path with imposed minimum radii of curvature, defined by shaping guide 100, compatible with the flow of the fluid. Hoses 97 and 99 also have a well-defined path between the couplings to which these hoses are connected.

In particular, the internal diameter of each hose 96 or 98 is preserved throughout the length of the pipes, since there is no risk of the pipes pinching due to the shape imposed by shaping guide 100. The flow of the fluid is thus made reliable.

In practice, the total length Lg of pipes 96 and 98, measured between coupling 94 and the equivalent coupling, depends on the developed length of retaining portions 106 and 116.

Advantageously, taking into account the geometry of shaping guide 100, a ratio R between the length Lg of one of pipes 96 and 98 and the distance d94 is strictly greater than 1. In practice, the ratio is preferentially greater than or equal to 5, preferentially yet again greater than or equal to 10.

In the example shown in the figures, the ratio is about R=1200/102=11.76.

Figure 6:
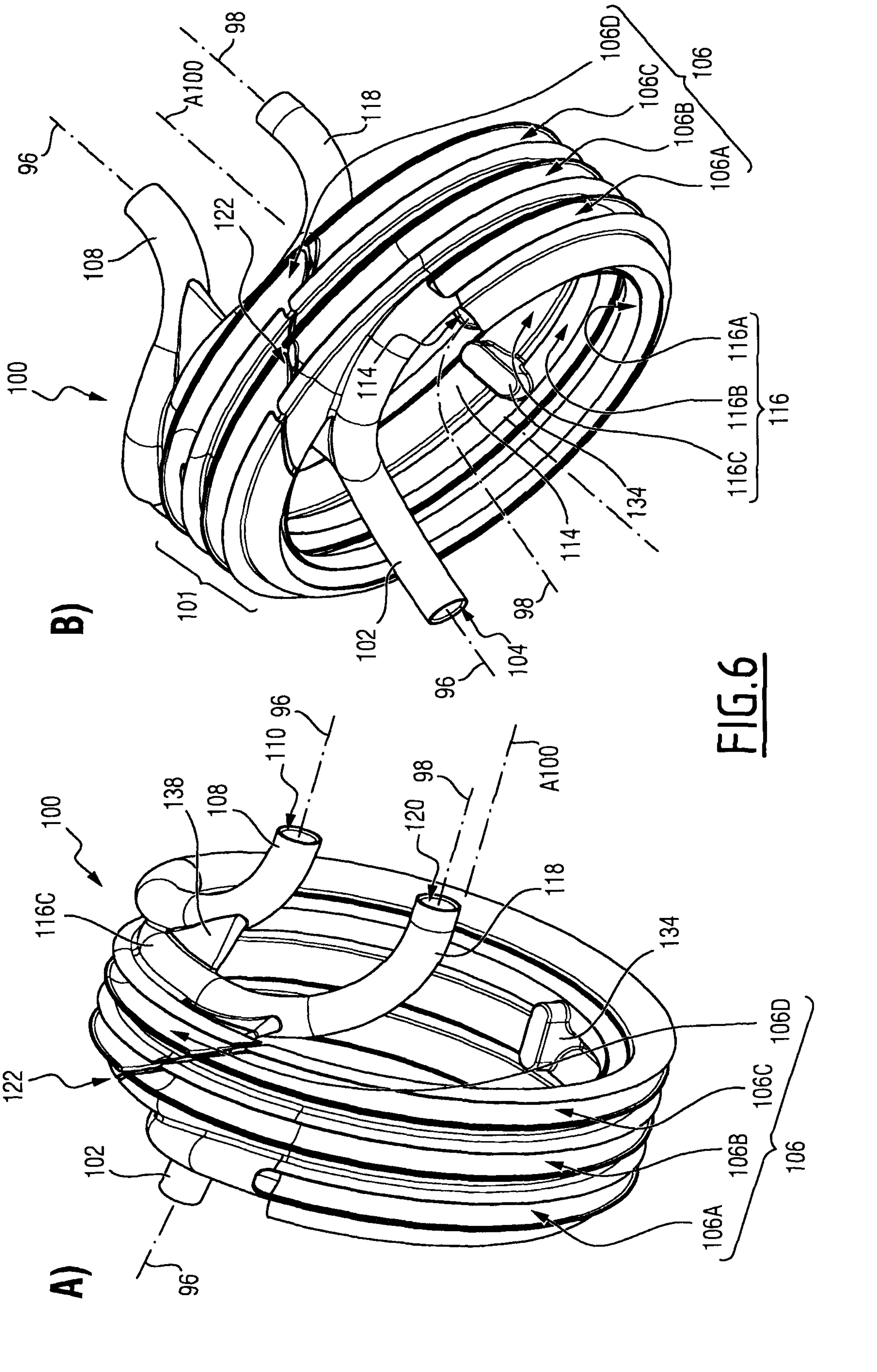
FIG. 6 shows, on two inserts A) and B) and on a smaller scale than FIGS. 4 and 5, a shaping guide according to a second embodiment of the invention, seen from two different angles.

In the second embodiment of the invention shown in FIG. 6, elements analogous to elements of the first embodiment have the same reference. If a part of shaping guide 100 of the second embodiment is mentioned in the description without being represented in the figures, it is the same part as the part mentioned for the first embodiment. On the other hand, if a reference is used on a part in FIG. 6 without being mentioned in the description, the part is the same as the part having the same reference in the first embodiment. Hereinafter, we mainly describe what differentiates the second embodiment from the first embodiment.

In the second embodiment, longitudinal slot 122 is not parallel to longitudinal axis A100 of the shaping guide, but oriented obliquely with respect to the latter. The annular slot extends throughout the length of almost-annular part 101 formed by retaining portions 106 and 116. The slot divides first retaining portion 106 into four segments 106A, 106B, 106C and 106D, and the second retaining portion 116 into three segments 116A, 116B and 116C.

A bend 102 with a mouth 104 is provided at the inlet of first retaining portion 116. Mouth 114 is provided directly at the inlet of retaining portion 116, without the use of an inlet tube comparable to tube 112 of the first embodiment.

First retaining portion 106 has a U-shaped section with the opening thereof oriented in a centrifugal direction with respect to axis A100, as in the first embodiment. Second retaining portion 116 has a C-shaped section, with the opening thereof oriented in a centripetal direction with respect to axis A100.

No tubular element comparable to tubular elements 124 and 128 of the first embodiment is provided. In other words, if hoses run radially inside retaining portions 106 and 116, about central body 92, these hoses are not held in position by shaping guide 100.

Shaping guide 100 has no flange. The free ends of elbows 108 and 118 which define openings 110 and 120 may thus be freely positioned, one with respect to the other and with respect to central body 92, in particular holes 92A and 92B thereof. A stiffening reinforcement 138 is provided between the respective bases of elbows 108 and 118.

In this embodiment also, in cross-section, i.e., in cross-section in a plane radial to axis A100, each retaining portion 106 and 116 has a concave inner shape which surrounds pipe 96 or 98 over more than half of the circumference thereof. The above may be achieved by an arc of a circle or a U-shape which extends over an angular sector with an angle at the apex greater than or equal to 185°.

In the second embodiment, a ratio R defined as in the first embodiment, is strictly greater than 1, preferentially greater than or equal to 5, preferentially yet again greater than or equal to 10.

Whatever the embodiment, in the rest configuration, i.e., in the absence of any external force exerted on shaping guide 100, slot 122 has a width less than or equal to 8 mm, preferentially less than or equal to 5 mm, so that this slot extends over an angular sector, with respect to axis A100, with an angle at the apex a of less than 5°. Thus, in this example, the two retaining portions 106 and 116 surround axis A100 over an angular sector with an angle at the apex greater than or equal to 355°. In practice, by varying the width of slot 122, shaping guide 100 may be designed so that, in the rest configuration, retaining portions 106 and 116 surround axis A100 over at least 330°, preferentially over at least 345°, preferentially yet again over at least 351°, which prevents the hoses from following paths which are non-circular and/or non-tangent to first and second retaining portions 106 and 116.

Whatever the embodiment and according to one aspect of the invention which is not visible in the figures, sprayer 8 includes a circulation system, inside at least one of pipes 96 and 98, for a shuttle (not shown), which is sometimes called a scraper and which, by being pushed by a fluid, may be used for bleeding the pipe or pipes, when need be. Such system may use the technique described in WO-A-2021/009046. The shape imparted to pipes 96 and 98 by retaining parts 106 and 116, by inlet elements 102 and 112, and by outlet elements 108 and 118 is compatible with passage of the shuttle. More particularly, the minimum radius of curvature of the sections of each of pipes 96 and 98 in place in retaining portions 106 and 116 and the minimum radius of curvature of the parts of the pipes in place in elbows 102, 108 and 118 are chosen to be greater than or equal to a minimum radius of curvature, so that the shuttle may circulate through the pipe, which avoids any risk of jamming of the shuttle. Circulation of the shuttle is thus made reliable.

Thereby, whatever the embodiment, shaping guide 100 makes it possible to hold in position the sections of pipes 96 and 98 arranged in retaining portions 106 and 116, with a predetermined geometry, compatible with a good flow of fluid inside the pipes and with the possible passage of a shuttle for purging the pipes.

According to a variant of the invention (not shown), the number of retaining portions of the shaping guide of the invention may be different from two, in particular equal to one or greater than or equal to three.

According to another variant (not shown), the slot may divide the retaining portion or portions into a number of segments different from the segments shown in the figures, according to the number of windings provided for the spirals formed by the retaining portions.

According to another variant of the invention (not shown), when the shaping guide includes at least two retaining portions, these portions may be arranged at the same radial level with respect to axis A100, and not radially one inside the other, as in the examples shown in the figures.

According to another variant of the invention (not shown), the shaping guide may include a number of tubular elements for guiding and locally retaining pipes, other than zero or two, e.g., equal to one or to three.

In a variant, the retaining portions are tubular portions with a closed cross-section, and not with a U-shaped or a C-shaped cross-section.

In a variant, the pattern in relief formed by stud 134 is not a protruding pattern in relief, as in the examples shown in the figures, but a recessed pattern in relief, in particular a housing, and central body 92 is provided with a protruding pattern in relief with a corresponding shape.

The aforementioned embodiments and variants may be combined for generating new embodiments of the invention.

The invention claimed is:

1. A shaping guide for a feeder pipe for feeding a fluid into a spraying element belonging to a coating product spray sprayer, wherein the shaping guide is configured for being mounted around a central body of the coating product sprayer and comprises at least one spiral-shaped retaining portion for retaining in position a section of the feeder pipe, with a predetermined geometry, providing electrical insulation between a mouth and an outlet of the feeder pipe, and wherein each said spiral-shaped retaining portion has, in a cross-section, a concave inner shape configured for surrounding the section of the feeder pipe over more than half of the circumference thereof of the section of the feeder pipe.

2. The shaping guide according to claim 1, wherein the concave inner shape of the cross-section is an arc of a circle or a U-shape which extends over an angular sector with an angle at the apex greater than or equal to 185°.

3. The shaping guide according to claim 1, comprising at least two spiral-shaped retaining portions for retaining in position, two distinct sections of the feeder pipe.

4. The shaping guide according to claim 3, wherein said at least two spiral-shaped retaining portions are centered on a common axis.

5. The shaping guide according to claim 4, further comprising inlet and outlet bends switching the feeder pipe from an orientation overall parallel to the common axis to an orientation overall ortho-radial to the common axis, or vice versa.

6. The shaping guide according to claim 1, further comprising a flange for positioning at least one output element of one of said spiral-shaped retaining portions.

7. The shaping guide according to claim 1, further comprising an almost-annular part which extends along a longitudinal axis and which has a longitudinal slot, and wherein, in the rest configuration of the shaping guide, said almost-annular part surrounds the longitudinal axis over strictly less than 360° and over at least 330°.

8. The shaping guide according to claim 7, wherein, in the rest configuration of the shaping guide, said almost-annular part surrounds the longitudinal axis over at least 345°.

9. The shaping guide according to claim 8, wherein, in the rest configuration of the shaping guide, said almost-annular part surrounds the longitudinal axis over at least 351°.

10. The shaping guide according to claim 1, wherein it is produced by additive manufacturing.

11. The shaping guide according to claim 1, wherein each spiral-shaped retaining portion comprises a plurality of turns.

12. The shaping guide according to claim 1, wherein each spiral-shaped retaining portion has a developed length greater than or equal to 80 cm.

13. The shaping guide according to claim 12, wherein each spiral-shaped retaining portion has a developed length greater than or equal to 100 cm.

14. A sprayer of coating product comprising:

a spraying element; and a feeder pipe for feeding the spraying element with a coating product to be sprayed and/or a cleaning product, comprising a shaping guide for shaping the feeder pipe according to claim 1, wherein the section of said feeder pipe is engaged in and held in position with the predetermined geometry by at least one of the spiral-shaped retaining portions of said shaping guide.

15. The sprayer according to claim 14, comprising a central body, wherein said shaping guide is mounted around said central body.

16. The sprayer according to claim 15, wherein said shaping guide is provided with at least one pattern in relief for positioning on said central body and/or on another part of the sprayer.

17. The sprayer according to claim 14, wherein the sprayer is equipped with a shuttle circulating through said feeder pipe, and wherein the at least one of the spiral-shaped retaining portions for retaining in position the section of said feeder pipe is configured so that a radius of curvature of said feeder pipe in place on said shaping guide is, throughout the length of said feeder pipe, greater than or equal to a minimum radius of curvature so that the shuttle circulates inside the pipe.

18. The sprayer according to claim 14, wherein a ratio between a length of said feeder pipe between couplings connecting the feeder pipe in the sprayer, and a distance, measured parallel to a longitudinal axis of a part of a main body of the sprayer, between the couplings is strictly greater than 1.

19. The sprayer according to claim 18, wherein the ratio is greater than or equal to 5.

20. The sprayer according to claim 19, wherein the ratio is greater than or equal to 10.

21. An installation for applying a coating product comprising a sprayer according to claim 14.

* * * * *